June 2, 1959

C. WHEATLEY 2,888,950

HYDRAULIC CHECK VALVE

Filed Aug. 13, 1956

INVENTOR.
Charles Wheatley
BY
ATTORNEY

United States Patent Office 2,888,950
Patented June 2, 1959

2,888,950

HYDRAULIC CHECK VALVE

Charles Wheatley, Tulsa, Okla.

Application August 13, 1956, Serial No. 603,713

1 Claim. (Cl. 137—514)

This invention is generally concerned with an improvement in check valves, and relates more particularly, but not by way of limitation, to a check valve wherein the movement of the clapper member is controlled to prevent slamming thereof against the valve body, and the hinge pin or pivot shaft for the clapper is efficiently sealed to preclude leakage of fluid therearound.

The high pressure operating conditions and vibrations often present in a check valve during utilization thereof may cause a leakage of fluid through the present day stuffing glands provided around the hinge pin of the valve clapper member, and the packing members are thus rendered ineffective. When this fluid leakage occurs, the operator of the valve usually applies torque to the adjusting members or screws of the stuffing box in order to tighten the packing members thereof around the outer periphery of the pivot shaft in an effort to stop the leakage by pressure of the packing thereagainst. The most common method of increasing the pressure of the packing members is the utilization of a wrench to tighten the packing members by hand to the utmost of the operator's physical strength to obtain the best possible seal.

This exertion of force may result in the freezing of the pivot shaft so that the hinge pin is unable to swing freely during the actuation of the clapper member. Low pressures passing through the valve may not exert enough force on the clapper to open the valve to a full open position when the clapper cannot swing freely, thereby causing an inefficient operation of the valve.

The present invention contemplates a means of sealing the hinge or pivot shaft in a manner whereby the pivot shaft cannot be frozen, and thus overcomes this serious disadvantage found in many check valves of today. A novel stuffing gland is provided for the shaft wherein a static seal is provided between the valve body and the gland, and a dynamic seal is provided between the stuffing box and the rotating pivot shaft. The sealing action of the novel stuffing box does not depend upon a continued tightening of the packing members adjacent the outer periphery of the shaft, thereby permitting the shaft to be freely rotatable without leakage of fluid therearound.

Many of the present day check valves are subjected to severe slamming of the clapper member against the interior of the valve body, especially at the discharge end of a pump or compressor wherein the flow of pressure is not constant. The slamming of the clapper member is caused by the sudden surges of pressure through the valve which open and close the clapper member rapidly, permitting weight of the clapper to creat a slamming thereof against the valve seat. The slamming of the clapper member has been known to be so severe as to knock the clapper off the pivot shaft and burst the valve body, and in some instances even split the flow adjacent the valve. Under actual field conditions wherein the valve is interposed in a flow line, personnel working around a valve, particularly valves of large dimensions, will often run in a direction away from the valve for personal safety when they hear the valve begin to slam because they are well aware of the physical dangers which can result therefrom.

In the present invention, the clapper member is directly connected through the pivot shaft member to a rack and pinion to control the actuation of the clapper in a manner which eliminates the dangerous and undesirable slamming. The rack and pinion action is hydraulically controlled to cushion the closing movement of the valve clapper, and thus preclude the slamming thereof against the valve seat. The clapper member is maintained in a positive closed position or positive open position, according to the flow of fluid therethrough, and substantially eliminates any fluttering action of the clapper due to flow line pulsations, such as caused by a reciprocating pump interposed in the flow line. The fluttering of the clapper can cause an improper metering of the fluid flowing through the flow line so that the meter will not register the true volume passing therethrough. Thus, the design and construction of the valve provide a novel check valve which substantially eliminates many serious disadvantages of present day valves, and greatly increase the efficiency in the operation thereof.

It is an important object of this invention to provide a novel check valve wherein the pivotal movement of the clapper member is controlled to eliminate slamming thereof against the valve seat within the valve body.

It is another object of this invention to provide a novel check valve whereby the clapper member is maintained in a positive open or positive closed position, depending upon the flow of fluid therethrough, to substantially preclude any fluttering action thereof, thus increasing the efficiency of the valve operation.

It is still another object of this invention to provide a novel stuffing gland for the pivot shaft of the clapper member wherein the sealing action is not dependent upon an increasing pressure of the packing member adjacent the outer periphery of the shaft, thereby providing for a free rotation thereof without leakage of fluid therearound.

It is a further object of this invention to provide a novel check valve which is so designed and constructed to prolong the useful and efficient life thereof thereby providing an efficient valve which is durable and economical in construction.

Other objects and advantages of the invention will be evident from the following detailed description, read in conjunction with the accompanying drawings, which illustrate my invention.

Figure 2:
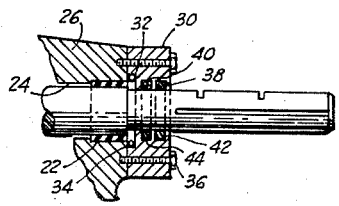
Figure 2 is a sectional detail view of the novel packing gland portion of the invention with portions thereof shown in elevation.
Figure 3:
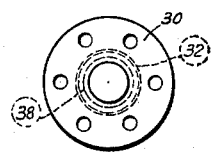
Figure 3 is a side elevational view of the novel packing gland portion shown in Fig. 2.

Referring to the drawings in detail, reference character 10 generally indicates a check valve comprising a substantially cylindrical body portion 12 having a clapper member 14 pivotally secured therein, and adapted to seat against an inwardly directed circumferential flange portion 16 of the valve body 12. The clapper member 14 is provided with an arm member 18 which extends radially upward therefrom and is suitably secured or keyed to a transverse pivot shaft member 20. The pivot shaft, or hinge pin member 20 is journalled at each end in similar bearing sleeve members 22, one of which is shown in Fig. 2. In this manner, the clapper 14 is pivotally secured within the valve body 12 and may be freely moved to alternate open and closed positions. The sleeve members 22 are preferably made of an oilite bronze material, or the like, but not limited thereto, to provide an efficient pivot action for the shaft 20 and reduce the necessity of providing lubrication to the bearing sleeve members. As clearly shown in Fig. 2, the bore 24 extending transversely through the valve body 12 for receiving the shaft 20 is slightly larger than the diameter of the shaft so that the shaft is freely supported in the bearing members 22, and the body portion in no way interferes with the pivotal action thereof. The shaft member 20 extends through the valve body 12 and outwardly therefrom through a pair of oppositely disposed boss members 26 and 28.

An annular packing gland member 30 is disposed around the shaft member 20 adjacent each of the boss members 26 and 28. The gland 30 is provided with an annular groove 32 (Fig. 2) on one face thereof for receiving a packing ring member 34. The gland 30 is rigidly secured to the boss members by suitable studs or bolt members 36 to provide metal to metal contact therebetween so that the packing ring member 34 is disposed therebetween to provide a static seal between the gland and the boss members for precluding leakage of fluid therebetween. A pair of spaced circumferential grooves 38 and 40 are provided on the inner periphery of the gland 30 to receive packing ring members 42 and 44 adjacent the periphery of the shaft 20. The packing members 42 and 44 are preferably of the O-ring type well known in the check valve industry, and provide a dynamic seal between the gland 30 and the shaft 20 to preclude the leakage of fluid therebetween. A suitable grease fitting 48 (Fig. 1) is provided for the packing gland 30 and is in communication with the circumferential grooves 38 and 40 by means of a substantially Y-shaped passageway (not shown). Thus, in applications where there is very little or no moisture present within the valve body 12, lubrication may be provided to the ring members 42 and 44 to preclude damage thereto from friction between the packing members 42 and 44 and the periphery of the rotating shaft 20, as will be hereinafter set forth.

The packing gland 30 provides a positive static seal between the boss members 26 and 28 and the packing gland members 30 thereagainst, thus precluding leakage of fluid from the interior of the valve body between the valve body and the packing gland. Furthermore, the packing members 42 and 44 provide a positive dynamic seal between the gland 30 and the shaft 20 to eliminate leakage of fluid therebetween even during rotation of the shaft 20 with respect to the gland 30. Thus, the shaft 20 is freely rotatable in the bearing sleeve members 22, and in no manner can tightening of the packing gland 30 adjacent the boss members 26 and 28 cause a freezing of the pivot shaft to hinder the free pivotal movement thereof.

Figure 4:
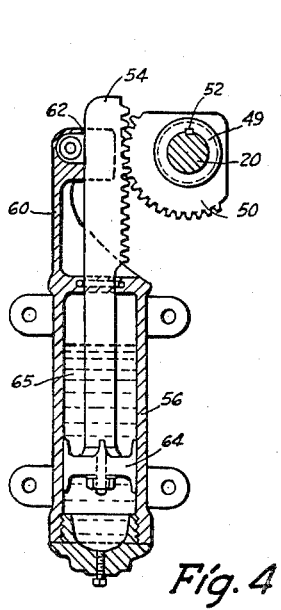
Figure 4 is a sectional elevational view of the rack and pinion operating mechanism taken on line 4—4 of Fig. 1.

A sleeve member 49 having a pinion gear member 50 (Figs. 1 and 4) thereon is secured to the shaft 20 adjacent each of the packing gland members 30 by a plurality of bolt members 41 and the key members 52. Thus, the pinion gear is actuated upon rotation of the shaft 20. The gear 50 preferably comprises one quadrant of a circle as clearly shown in Fig. 4 and meshes with a complementary rack member 54 for vertical reciprocation thereof throughout the distance limited by the quarter circle configuration of the gear 50. The rack member 54 extends vertically downward into a cylinder member 56 which is rigidly secured to the valve body 12 by suitable bolt members 58. The cylinder 56 is provided with an upwardly extending arm member 60 having a slotted or yoke shaped upper end portion 62 for receiving therethrough and guiding the rack member 54 in its vertical movement.

Figure 5:
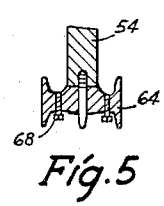
Figure 5 is a detail view of the lower end of the piston member shown in Fig. 4.
Figure 6:
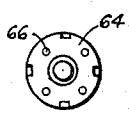
Figure 6 is an end view of the piston shown in Fig. 5.

A piston head 64 is suitably secured to the lower end portion of the rack member 54 and moves reciprocally within the cylinder 56 upon movement of the rack member 54. The cylinder 56 is partially filled with a suitable non-freezing fluid 65 to dampen or cushion the movement of the piston head 64 within the cylinder for a purpose as will be hereinafter set forth. The piston head 64 is provided with a plurality of circumferentially spaced threaded bores 66 (Fig. 6) for threadedly receiving stud members 68 (Fig. 5). The studs 68 may be readily removed or inserted in the piston head, as desired, to control the speed with which the piston may move through the fluid 65 as will be hereinafter set forth. A fluid filler tube 70 (Fig. 1) is provided for the cylinder 56 for supplying fluid thereto.

Suitable counterbalance members 72 are provided at the outer ends of the shaft 20 and are suitably keyed thereto for facilitating the actuation thereof during operation of the check valve 10.

*Operation*

The check valve 10 is interposed within a flow line (not shown) in any suitable manner well known in the industry, such as bolt members (not shown) cooperating with the circumferentially spaced apertures 74 provided on the outwardly extending flange member 76 of the valve body 12. Fluid pressure flowing through the flow line and through the valve 10 in one direction will strike or impinge against one face of the clapper member 14 to swing the clapper about the pivot axis thereof toward an open position. The pivot axis rotates freely within the bearing members 22 upon rotation of the clapper member 14. Rotation of the pivot shaft actuates the pinion gear 50 secured thereto to vertically raise the rack member 54 upward from the position shown in Fig. 4. As hereinbefore set forth, any desired number of the bores 66 may be open in the piston head 64 to reduce the restriction of the fluid 65 against the movement of the piston head therethrough, thus providing a freedom of upward movement of the rack member 54 in accordance with the conditions under which the valve 10 must be utilized. The meshing of the teeth of the pinion gear 50 and rack 54 maintain the clapper member in a positive open position in accordance with the pressure acting against the face of the clapper. When the pressure passing through the valve 10 decreases sufficiently, or the direction of the flow stream therethrough is reversed, the clapper will tend to move toward a closed position adjacent the valve seat flange 16. The cushioning effect of the fluid 65 within the cylinder 56 will control the downward movement of the rack member 54, and thus control the rotation of the pinion gear 50. Thus, the rotation of the pivot shaft 20 will be controlled to easily close the clapper member 14 adjacent the valve seat. The meshing of the teeth of the gear 50 and rack 54 will maintain the clapper in a positive closed position adjacent the valve seat until sufficient fluid pressure once again acts upon the clapper 14 to move it toward an open position.

Figure 1:
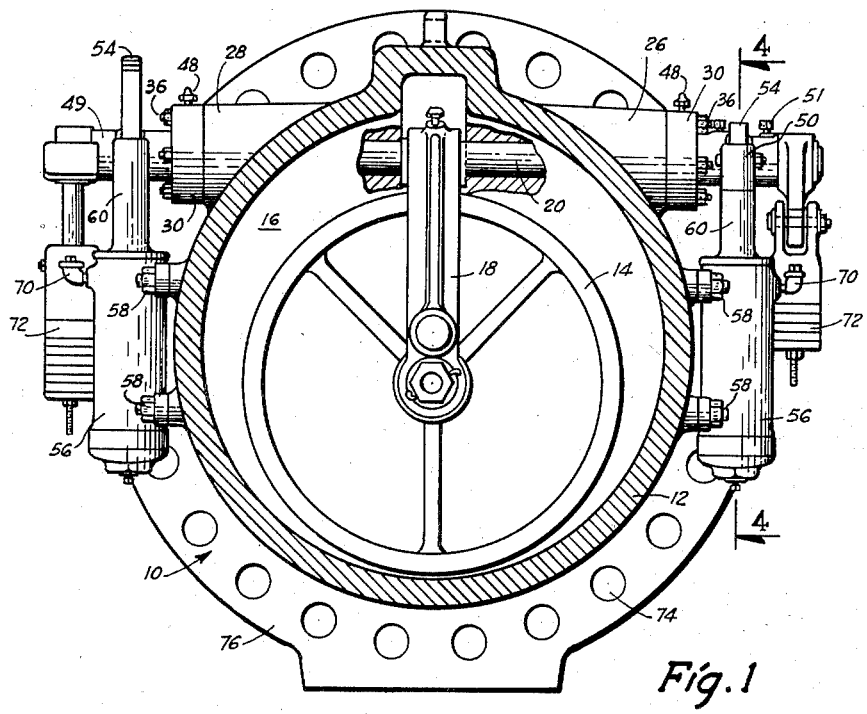
Figure 1 is a side elevational view of a check valve embodying the invention with a portion cut away for purposes of illustration.

For purposes of illustration, the rack and pinion arrangement shown on the left hand side of Fig. 1 depicts the position thereof when the clapper member 14 is in a full open position. Similarly, the rack and pinion arrangement shown on the right hand side of the figure depicts the position thereof when the clapper 14 is in a closed position. It will be understood that both rack and pinion members operate simultaneously, and in the same direction, during operation of the valve 10.

The cushioning effect of the fluid within the cylinder 56 precludes slamming of the clapper 14 against the valve seat 16 regardless of the sudden surges of pressure which may be present within the flow line or valve body. Furthermore, the rack and pinion action maintains a positive open or closed position for the clapper member, in accordance with the fluid pressure acting thereon, to substantially preclude fluttering of the clapper member during pressure fluctuations within the flow line or valve 10. Thus, the useful life of the valve is greatly prolonged, and serious damages resulting from severe slamming of the clapper are substantially eliminated. The valve provides a more efficient control of the fluid passing therethrough, and the seal provided around the hinge or pivot shaft efficiently precludes leakage of fluid pressure therearound thereby providing a more efficient operation for the valve.

From the foregoing, it will be apparent that the present invention provides a novel check valve wherein a free action of the pivot shaft for the clapper member is assured at all times. The opening and closing movement of the clapper member is controlled in order to prevent slamming of the clapper member against the valve seat, thereby reducing wear and damage thereto during the utilization of the valve. The clapper member is maintained in a positive open or closed position to preclude fluttering of the clapper, thereby increasing the efficiency of the control of the fluid flowing therethrough. The novel valve is of a durable construction which greatly prolongs the useful life thereof, and greatly reduces hazards often found in the utilization of present day check valves.

Changes may be made in the combination and arrangement of parts as heretofore set forth in the specification and shown in the drawings, it being understood that any modification in the precise embodiment of the invention may be made within the scope of the following claim without departing from the spirit of the invention.

What is claimed is:

In a check valve comprising a housing, a clapper member within the housing, a transverse shaft member journalled within the housing for pivotally supporting the clapper member therein, a pinion gear secured to the shaft at each end thereof for rotation therewith, a rack member cooperating with each pinion gear and vertically reciprocated by actuation of the pinion gears, said rack and gear members cooperating to maintain a positive open or closed position for the clapper to preclude fluttering thereof, a piston member provided on each rack member, each of said piston members reciprocally disposed within a cylindrical housing member, fluid provided in each of said cylindrical housing members to control the reciprocal movement of the pistons and thereby cushion the pivotal movement of the clapper toward a closed position, and sealing means provided around opposite ends of the shaft for precluding leakage of fluid therearound, said sealing means comprising an annular body portion, an annular groove in the body portion for receiving a packing member, means for securing the annular body adjacent the valve housing whereby the packing member is interposed therebetween to provide a static seal therefor, and a plurality of circumferential grooves provided on the inner periphery of the annular body portion for receiving sealing ring members to provide a dynamic seal between the annular body and the pivot shaft.

References Cited in the file of this patent
UNITED STATES PATENTS

| | | |
|---|---|---|
| 1,077,502 | Anderson | Nov. 4, 1913 |
| 1,525,487 | Woolson | Feb. 10, 1925 |
| 1,574,601 | Brundage | Feb. 23, 1926 |
| 2,394,364 | Christensen | Feb. 5, 1946 |
| 2,760,512 | Nechine | Aug. 28, 1956 |